Dec. 11, 1934.   S. M. LANGSTON ET AL   1,984,042
CUT-OFF MECHANISM
Filed May 12, 1933   5 Sheets-Sheet 1

INVENTORS
Samuel M. Langston
Hari Sieg
BY
ATTORNEYS

Dec. 11, 1934.     S. M. LANGSTON ET AL     1,984,042
CUT-OFF MECHANISM
Filed May 12, 1933     5 Sheets-Sheet 2
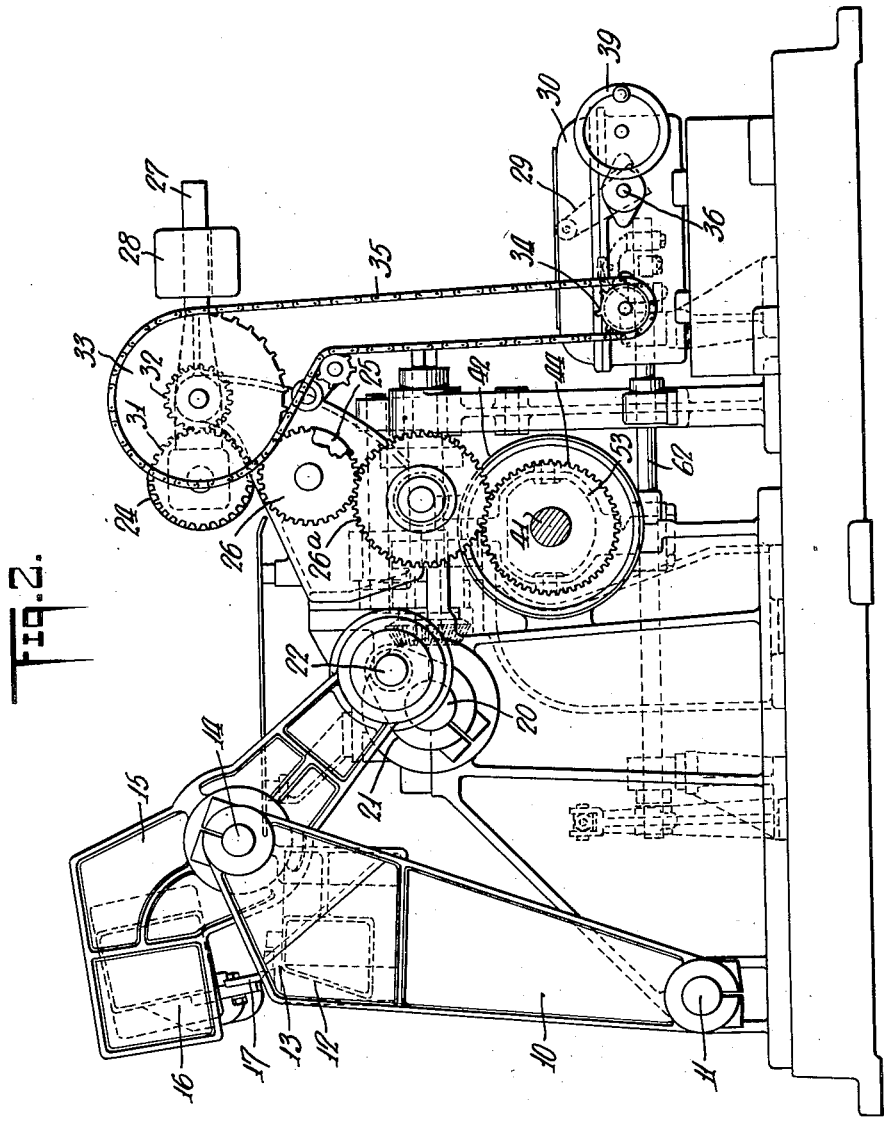
INVENTORS
Samuel M. Langston
Karl Sieg
BY
ATTORNEYS

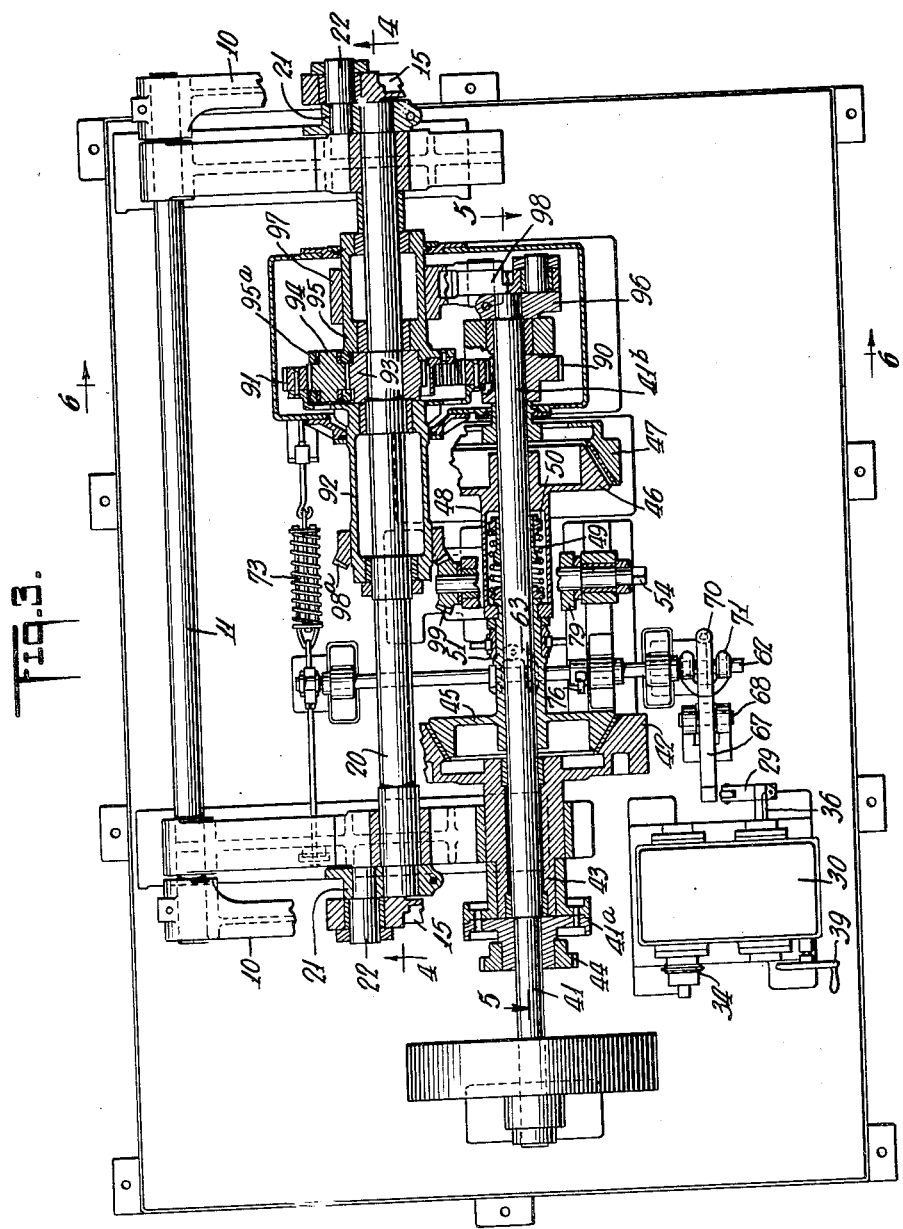

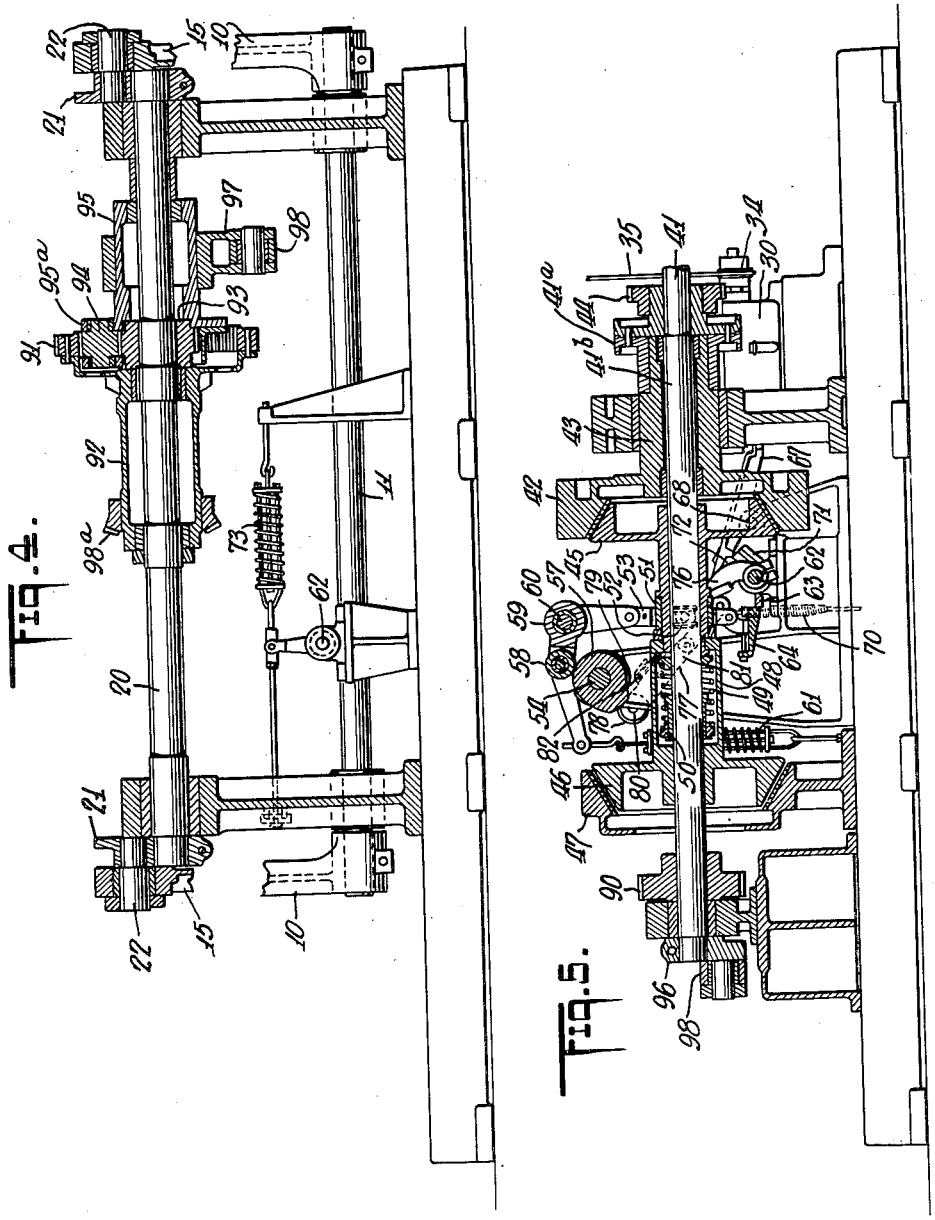

Dec. 11, 1934.        S. M. LANGSTON ET AL        1,984,042
CUT-OFF MECHANISM
Filed May 12, 1933        5 Sheets-Sheet 5
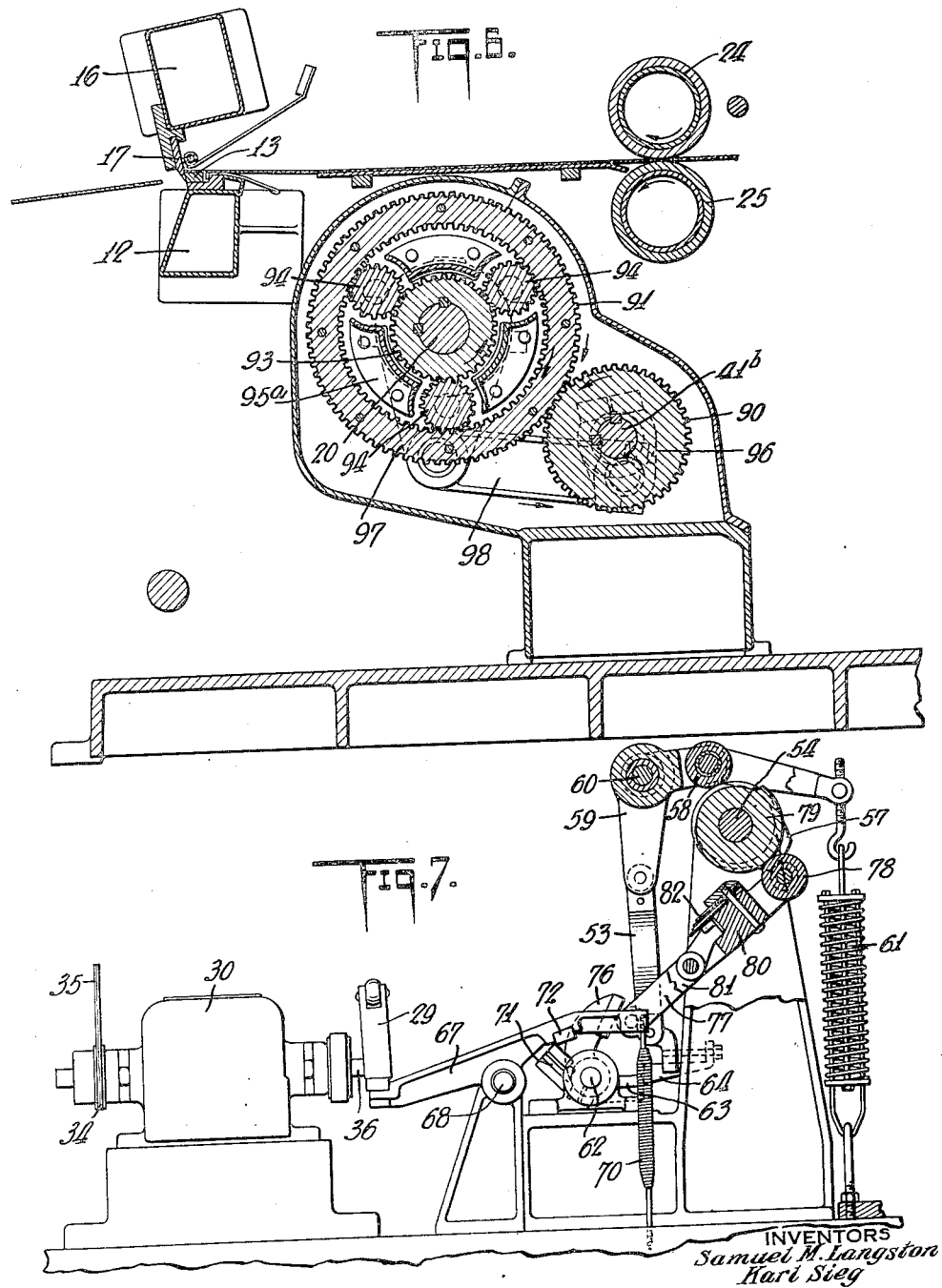

Patented Dec. 11, 1934

1,984,042

UNITED STATES PATENT OFFICE 1,984,042

CUT-OFF MECHANISM

Samuel M. Langston, Wenonah, N. J., and Karl Sieg, Philadelphia, Pa., assignors to Samuel M. Langston Co., Camden, N. J., a corporation of New Jersey Application May 12, 1933, Serial No. 670,710

15 Claims. (Cl. 164—43)

This invention relates to flying shears or traveling cut-offs for transversely subdividing comparatively stiff material, such as double-faced corrugated board into successive sections during the continuous travel of the material.

One object of the present invention is to secure uniformity in the lengths of the cut sections, irrespective of the speed of the machine, or the frequency or extent of the changes in speed.

In large, high speed machines in which the cut-off mechanism is intermittently operated and the knives are brought to rest between successive cuts while the end of the material which is to be cut off is being advanced to the required distance, it is necessary that the knives be powerfully driven and positively stopped alternately for each cut-off section of the material. At high speed, the stopping of the knives and their connecting parts at the end of each cycle of operation and restarting for the next cycle subjects the machine to severe stresses and shocks.

The use of a pair of elliptic gears between the cutter and the clutch will reduce the speed of the cutter to a limited extent before the clutch is disengaged and the brake is applied, but it is not practical to employ such gears in which the maximum radius is much more than twice the minimum radius.

One object of the present invention is to provide a driving connection for the cut-off mechanism, which will drive said mechanism at varying speeds during each cycle of operation thereof, and which will have a minimum speed materially lower than that which can be obtained practically by elliptical gears, so that at the instant the clutch is released and the brake is applied, the mechanism will have been decelerated substantially toward or to a rest position. Likewise, a sudden starting torque is not applied to the cut-off mechanism when the clutch is reengaged for starting the cycle of operation, and the torque is gradually built up from substantially zero.

Various other objects, advantages, and important features will be pointed out hereinafter, or will be apparent from a considertion of the specific construction illustrated in the accompanying drawings, and which constitute only one of the many possible embodiments of the invention hereinafter claimed.

In these drawings:

Fig. 2 is a view of the other side of the machine.

Fig. 3 is a top plan view of certain of the parts shown in a horizontal section.

Figure 1:
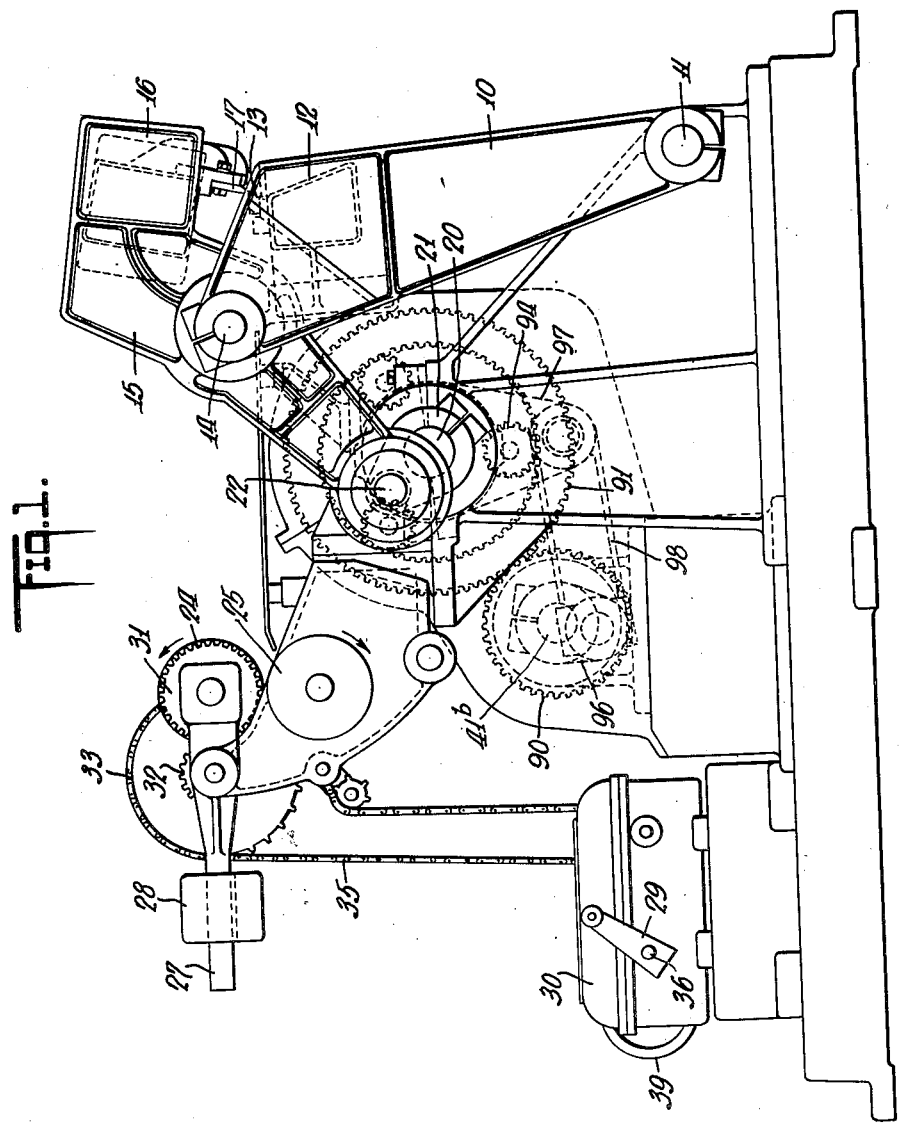
Fig. 1 is a view of one side of the machine.

Figs. 4, 5 and 6 are sections taken on the lines 4—4, 5—5 and 6—6 respectively of Fig. 3, and Fig. 7 is a front view of the trip mechanism for initiating the operation of the cut-off mechanism from a state of rest.

The cut-off mechanism as illustrated is an embodiment of the invention disclosed and claimed in the Langston Patent No. 1,359,076, and includes a pair of upstanding arms 10 pivoted at opposite sides of the machine on a transverse rock shaft or pair of pivot pins 11, and connected at their upper ends by a transverse beam 12 which carries the lower knife or cutting member 13. Each arm 10 carries a pivot pin 14 on which is mounted a lever 15, the two levers at their upper front ends carrying a transverse beam 16 on which is mounted the upper knife or cutter 17. The arms 10 extend substantially vertically so that the knife 13 swings back and forth substantially horizontally and approximately in the path of travel of the sheet.

The knives 13 and 17 are approximately the same distance from the pivot pins, so that as the knife 17 moves up and down it cooperates with the lower knife to shear the material, and in its lower operating position is only slightly below the lower knife 13. For driving the knives and their carrying members, there is provided a transverse shaft 20 having cranks 21 carrying crank pins 22 in the ends of the levers 15.

This is only one of the many types of traveling cut-offs or flying shears in which the knives travel in the direction of travel of the sheet at the instant of cutting, and which may be employed in the present invention.

In the construction illustrated means are provided for controlling the operation of the cut-off mechanism in accordance with the actual speed of travel of the material to be cut, and varying at will the length of the sections into which the material is to be cut. In the form shown, there is provided a freely rotatable roller 24 having a peripheral engagement with the traveling paper, so as to be frictionally rotated thereby at a peripheral speed exactly equal to the linear speed of travel of the paper. The roller 24 advantageously constitutes the upper part of the feeding mechanism, and cooperates with a lower feed roller 25, the shaft of which is driven by any suitable means from the drive of the machine. In the specific form shown, the shaft of the roller 25 has a gear 26 (Fig. 2) which is positively driven from a gear 44 on the power input shaft through a gear 26a.

The upper roller 24 is carried by a pair of pivoted arms 27 so that it may rest by its own weight on the advancing material and press the latter on to the feed roller 25. It is advantageously provided with a peripheral layer of resilient material, such as rubber, to increase its frictional engagement with the traveling material. The pressure of the roller 24 upon the traveling material may be regulated by means of a counter balance weight 28 slidable along one of the arms 27.

The roller 24 continuously rotates a control member in the form of a trip 29 which releases the mechanism which operates the cut-off mechanism, and which permits movement of the latter through one cycle of operation from a rest position. Since this trip operates at a speed proportional to the speed of travel of the material, any variation in the speed of the material will cause a corresponding variation in the speed of rotation of the trip.

There is provided a variable speed drive 30 in the transmission between the roller 24 and the trip 29, for selectively varying the speed ratio between the trip and the roller to obtain any desired variation in the length of section to be cut.

In the specific embodiment shown, this includes a gear 31 connected to the shaft of the roller 24 and meshing with a pinion 32 coaxial with the pivot of the arms 27. This pinion 32 is connected to a large sprocket wheel 33, which, by means of a chain 35, drives a much smaller sprocket wheel 34 connected to the input shaft of the variable speed device 30. The output shaft 36 of this device carries the trip 29.

The variable speed device 30 may be of any suitable construction, such as the well known P. I. V. drive or Reeves drive shown in the Langston Patent No. 1,840,962, and has some form of control handle 39 by means of which the speed ratio between the input and output shafts of the device may be varied at will and preferably while the machine is running.

The desired changes in the length of sheet cut may be effected in a simple manner through the operation of the control handle 39 which causes variations in the speed ratio between the trip 29 and the roller 24, and corresponding variations in the frequency of operation of the cut-off mechanism for any given speed of the material.

The features of the invention already described may be embodied in a machine of the type similar to that shown in our Patent No. 1,660,884, in which there is provided a clutch for operating the cut-off mechanism, and a brake for stopping said mechanism after a single cycle of operation. In this type of construction there is provided a power input shaft 41 for driving the shaft 20 through a clutch and gearing. The shaft 41 is connected to a sleeve 43 by means of a coupling 41a. This sleeve 43 forms a journal for a shaft 41b coaxial with the shaft 41 and is rigid or integral with the female member 42 of the clutch.

The clutch as shown includes a conical clutch member 45 keyed to slide on the shaft 41b, and the brake includes a conical brake shoe 46 also keyed on the shaft 41b to move into or out of engagement with a non-rotatable brake member 47. The two members 45 and 46 are connected together and face in opposite directions, so that they may move axially to either engage the brake or engage the clutch. For that purpose, they are connected by a sleeve 48 having a coil spring 49 disposed between a shoulder on the sleeve and a collar 50 on the shaft 41, said spring normally tending to push the sleeve towards the left as shown in Fig. 3 to engage the clutch and disengage the brake.

The mechanism for operating the brake and clutch includes a sleeve or collar 51 mounted on the sleeve 48, and provided with a trunnion or other pivotal connection 52 on opposite sides of a gimbal ring 53 (Fig. 5). This ring is larger than the collar 51, so that it may tilt and its upper and lower edges may move limited distances in the general direction of the length of the shaft 41. This gimbal ring is provided with a stop at one end, and an actuating mechanism at the other. This actuating mechanism (Fig. 7) includes a shaft 54 which is geared to rotate at the same speed as the crank shaft 20, and which is provided with a cam 57 which engages a roller 58 on a bell crank lever 59. This lever 59 is mounted on a pivot shaft 60 and has the lower arm thereof pivoted to the upper portion of the gimbal ring 53. The arm which carries the roller 58 has an extension which is engaged by a coil spring 61 which serves to maintain the roller in engagement with the cam 57, so that as the cam rotates, the roller is raised and lowered, and the lower end of the lever 59 is moved back and forth in the general direction of the shaft 41.

The stop mechanism at the lower end of the gimbal ring 53 includes a rock shaft 62 having an arm 63 which may move into or out of the path of movement of an arm 64 connected to the lower portion of the gimbal ring 53.

The mechanism for operating the rock shaft 62 from the trip 29 includes a lever 67 pivotally supported intermediate of its end on a rock shaft 68 and having one end thereof in the path of travel of the outer end of the trip 29. The lever 67 is urged in a counterclockwise direction as shown in Fig. 5 and in a clockwise direction as shown in Fig. 7 by means of a spring 70 connected near the opposite end of the lever. However, while the clutch is engaged and the cut-off is operating, this lever 67 is held in position against the action of the spring 70 by means of an arm 71 connected to the rock shaft 62, and having the outer end thereof in engagement with a stop or lug 72 projecting from the underside of the lever 67. The rock shaft 62 is urged in a counterclockwise direction as shown in Fig. 5 and in a clockwise direction as shown in Figs. 4 and 7 by means of a coil spring 73, so that the arm 71 is spring-pressed against the lug or stop member 72 on the lever 67.

In the position shown in Fig. 5, the brake is disengaged, the clutch is engaged, and the cut-off is operating through a cutting phase. In this position the roller 58 is traveling on the low portion of the cam 57, so that the clutch member is freely urged towards the right, as shown in Fig. 5, to engage the clutch under the action of the spring 49. When the high portion of this cam 57 moves in contact with the roller 58, the gimbal ring 53 is angularly turned in a counterclockwise direction about the stop member 63 as a fulcrum, so as to disengage the clutch and engage the brake, thereby stopping the cut-off.

After a predetermined amount of material has passed the cut-off mechanism as determined by the rotation of the roller 24, the trip 29 will move into engagement with the right-hand end of the lever 67, thereby rotating said lever in a clockwise direction, as shown in Fig. 5 and in a counterclockwise direction as shown in Fig. 7 and moving the stop member 72 out of engagement with the arm 71. The shaft 62, under the action of the spring 73, will turn in a clockwise direction, so that the end of the arm 63 passes below the contact face of the arm 64, whereby the latter will instantly move towards the right under the action of the spring 49, because the spring is exerting an endwise thrust on the trunnion of the gimbal ring 53, and the upper side of said ring is prevented from moving towards the right by the engagement of the roller 59 and the high point of the cam 57.

As the gimbal ring 53 swings towards the right about its upper side as a center, the spring 49 forces the clutch into engagement and disengages the brake. Immediately the shaft 54 starts rotating and the high point of the cam 57 passes from beneath the roller 58, so that the spring 61 swings the bell crank lever and moves the end which is connected to the gimbal ring towards the right. During this movement, the trunnions 52 act as a fulcrum for the gimbal ring, and the lower side of the gimbal ring moves towards the left to a position beyond the end of the arm 63.

In order to rotate the shaft 62 into position to bring the arm 63 again into the path of the arm 64, there is provided an arm 76 connected to the rock shaft 62, and a lever 77 pivoted intermediate of its ends and having one end so positioned as to engage the arm 76 and swing it in a counterclockwise direction when the lever swings in the opposite direction (Fig. 7). For swinging the lever 77 in a clockwise direction, the upper end thereof has a roller 78 in engagement with a cam 79 on the shaft 54. The two cams 79 and 57 are so timed that the cam 79 operates on the lever 77 to swing the shaft 62 clockwise when the arm 64 and the gimbal ring are in position at the left-hand end of their range of movement.

When the lever 67 is moved out of engagement with the arm 71, the rock shaft 62, under the action of the spring 73, rotates in a clockwise direction, so that the arm 76 engages the lower end of the lever 77. For safety, the lever 77 may be made of two parts 80 and 81 pivotally connected together but normally held substantially rigid in respect to each other by a leaf spring 82, as shown in Fig. 7.

An important feature of the present invention resides in the improved transmission means for transmitting the intermittent action of the shaft 41 to the crank or operating shaft 20 of the cut-off mechanism. This transmission means operates to reduce the speed of the shaft 20 almost to zero, before the release of the clutch and the application of the brake, so as to minimize the power required to effect the stopping and starting of the heavy parts of the cut-off mechanism, and to minimize shocks resulting from the braking of such heavy parts while they are operating.

My improved transmission includes a differential gearing and means for varying the effect thereof so that it will drive the shaft 20 with a velocity varying from zero to the desired high speed and back to zero in each cycle. By differential gearing we mean a gearing in which one or more gears thereof may be moved bodily during the operation of the gearing to vary the speed ratio between the driving and driven members thereof.

The differential gearing between the shafts 20 and 41 includes a driving spur gear 90 connected to the shaft 41b and meshing with a large gear 91 encircling the shaft 20 and supported for relative rotation with respect thereto by means of a sleeve 92 having a roller bearing engagement with said shaft. Keyed to the shaft 20 and encircled by the gear 91 is a driven spur gear 93. The gear 91 is of annular form having internal and external teeth, and serves to drive the gear 93 through one or more differential pinions 94 journaled in the flange 95a at the end of a sleeve 95 which encircles the shaft 20, and which is supported thereon on roller bearings. Three of such pinions 94 are shown 120° apart for the purpose of providing a balanced arrangement.

The means for operating the differential gearing to vary the speed of the crank shaft 20, during its cycle of operation, includes a crank lever 96 on the shaft 41b, and an arm 97 connected to the sleeve 95, the eccentric pin on said crank shaft and said arm, being connected by a link 98. This construction serves to continuously bodily move the differential pinions 94 about the axis of the shaft 20 while the shaft 41b is rotating, and thereby vary the speed ratio of transmission of the differential gearing.

Any movement of the differential pinions 94 in a direction opposite to that of the gear 91 will serve to increase the speed of the gear 93 and the shaft 20 in respect to the speed of the gear 90 and the shaft 41b, and any movement of the pinions 94 in the same direction as the gear 91 will serve to decrease the speed of the gear 93. The extent of variation in the speed of the gear 93 will vary in accordance with the speed of bodily movement of the pinions 94 with respect to the speed of rotation of the gear 91. The speed with which the pinions 94 move about the gear 93 depends upon the relative position of the two levers 96 and 97. In the position shown in Fig. 6, the speed of bodily movement of the pinions 94 in the direction opposite to the direction of rotation of the gear 91 is approximately at its maximum. In this phase position, the gear 93 is being driven approximately at its maximum speed in respect to the substantially uniform speed of the shaft 41b, and the knives 13 and 17 are in cutting position and traveling with the paper.

As the crank lever 96 moves in a counterclockwise direction from the position shown in Fig. 6, the angular velocity of the lever 97 will be decelerated until the crank lever 96 reaches a position substantially 90° from that shown in Fig. 6. In that position, the lever 97 will have reached the limit of its movement in a counterclockwise direction, and will be in position to begin movement in the opposite direction. The lever 97 will then be rotated in a clockwise direction, and the differential pinions 94 moved bodily in this direction, which is the same as that of the gear 91. The speed of said pinions in this direction will be accelerated until the crank lever 96 is in a position about 180° in advance of that shown in Fig. 6. In this position, the speed of the pinions 94 in the direction of the gear 91 will have reached its maximum.

The gears are so proportioned that when the pinions 94 are driven at a maximum speed in the same direction as the gear 91, the speed of the gear 93 and the cutter is substantially zero. By means of this construction, the speed of the gear 93 and the cutter during one revolution thereof varies from zero to a maximum and back to zero, and the cutting occurs when the speed is high.

The ratio of the outside pitch diameter of the gear 91 to the pitch diameter of the gear 90 is equal to the ratio of the inside pitch diameter of the gear 91 to the pitch diameter of the gear 93. By means of these proportions, the mean angular velocity of the gear 90 and the shaft 41b is equal to the mean angular velocity of the gear 93 and the cutter, so that during one complete revolution of the gears 90 and 93, the differential gearing will have undergone a complete cycle of speed ratio variations.

The cam shaft 54 is operated in accordance with the operation of the crank shaft 20 so that when the speed of said shaft 20 is zero, the high portion of the cam 57 will ride under the roller 58, and thereby effect the disengagement of the clutch and the engagement of the brake.

The cam shaft 54 may be directly geared to the shaft 20, or as shown in the specific embodiment may be driven from the gear 91. For that purpose, the sleeve 92 to which said gear is connected has keyed or otherwise connected thereto a bevel gear 98a meshing with a gear 99 connected to the cam shaft 54.

The only function of the brake will be to stop the rotation of a few rotating parts, the heavy parts of the cut-off mechanism being made to stop by gradually decreasing its speed substantially to zero through the differential gearing. This construction eliminates any necessity for disengaging the clutch at any interval before the application of the brake. However, if desired, the advance part of the high portion of the cam may have a gradual slant, so that the clutch will be disengaged a short interval before the application of the brake. When the brake is applied, the gears of the differential will be in such phase position that the torque ratio transmitted to the shaft 20 will be zero.

When the cam 57 is rotated in position to initiate the next cycle of operation of the cut-off mechanism, and the clutch is engaged, there is no sudden application of a torque to the shaft 20, since the differential is in a phase position in which the ratio of torque transmitted is zero. The torque ratio will be built up until the desired cutting speed of the cut-off mechanism is attained. This method of operation serves to effect a smoother operation of the cut-off mechanism.

Having thus described our invention, what we claim as new and desire to secure by Letters Patent is:—

1. An apparatus for subdividing continuously advancing sheet material, including a cut-off mechanism, a driving member, a driving connection between said member and said cut-off mechanism for driving said cut-off mechanism through successive cycles at a speed varying from substantially zero with respect to said member up to a maximum and back to substantially zero during each cycle of operation, and means for stopping said driving member at the end of each cycle of operation of said cut-off mechanism when the speed of said mechanism reaches substantially zero.

2. An apparatus for subdividing continuously advancing sheet material, including a cut-off mechanism, a driving member, a driving connection between said member and said cut-off mechanism for driving said cut-off mechanism at speeds gradually varying during each cycle of operation from substantially zero to a predetermined amount and back to substantially zero with respect to the speed of said member, and means for stopping said driving member at the end of each cycle of operation when said connection reaches a phase position in which the torque transmitted to said mechanism with respect to the driving torque of said member is substantially zero.

3. An apparatus for subdividing continuously advancing sheet material, including a cut-off mechanism, a driving member, a driving connection between said member and said mechanism for driving said mechanism through successive cycles and for transmitting a torque to said cut-off mechanism varying during each cycle of operation from substantially zero to a predetermined amount and back to substantially zero with respect to the driving torque of said driving member, and means for initiating the rotation of said driving member from a state of rest at the beginning of each cycle of operation of said mechanism when said driving connection is in phase position in which the ratio of the torque transmitted is zero.

4. In combination, a cut-off mechanism, a driving member, a differential gearing between said mechanism and said member for driving said mechanism, means operated by the rotation of said driving member for moving a portion of said gearing bodily during each cycle of operation of said cut-off mechanism to vary the speed ratio of the latter during each of said cycles, a clutch for operating said driving member, and means for operating the clutch when said gearing is in slow speed driving position.

5. An apparatus for subdividing continuously advancing sheet material, including a cut-off mechanism, a drive, a differential gearing for transmitting power from said drive to said mechanism, means for varying the transmission ratio of said gearing during each cycle of operation of said mechanism to vary the speed of said mechanism, and to decrease the speed ratio of transmission substantially to zero in one phase of said cycles, whereby said mechanism will be at a substantial standstill at said phase, a brake for said transmission means, and means for applying said brake when the speed of said mechanism has been decelerated to a substantial standstill by the action of said gearing.

6. An apparatus for subdividing continuously advancing sheet material, including a cutter, a driven gear for operating said cutter, a drive gear, an annular gear encircling said driven gear and having internal and external teeth, the latter meshing with said drive gear, one or more differential pinions meshing with said driven gear and said internal teeth, and means for oscillating said differential pinions bodily around the axis of said driven gear to change the speed ratio of transmission between said drive gear and said driven gear during each cycle of operation of said cutter.

7. An apparatus of the class described, including a power input shaft, a drive shaft, a cutter shaft, a clutch between said input and drive shafts, a differential gearing between said drive and cutter shafts, means operated by said drive shaft for continuously varying the transmission ratio of said gearing, and means operated from a gear of said gearing for engaging said clutch when said gearing is in lowest speed transmission phase.

8. An apparatus of the class described, including a power input shaft, a drive shaft, a cutter shaft, a clutch between said input and drive shafts, a differential gearing between said drive and cutter shafts, means operated by said drive shaft for continuously varying the transmission ratio of said gearing, and means for engaging said clutch when said gearing is in lowest speed transmission phase.

9. An apparatus of the class described, including a power input shaft, a drive shaft, a cutter shaft, a clutch between said input and drive shafts, a brake for said drive shaft, a differential gearing between said drive and cutter shafts, means operated by said drive shaft for continuously varying the transmission ratio of said gearing, and means for engaging said brake when said gearing is in lowest speed transmission phase.

10. An apparatus of the class described, including a power input shaft, a drive shaft, a cutter shaft, a clutch between said input and drive shafts, a brake for said drive shaft, a differential gearing between said drive shaft and said cutter shaft, means operated by said drive shaft for continuously varying the transmission ratio of said gearing, and means for engaging said clutch and disengaging said brake when said gearing is in lowest speed transmission phase.

11. An apparatus of the class described, including a cutter shaft, a drive shaft, driving means therebetween having a uniform angular velocity, means for superimposing a pulsating velocity onto said angular velocity to reduce the speed of the cutter shaft to a minimum between successive cutting operations, and means for stopping said drive shaft when said cutter shaft is at substantially minimum speed.

12. An apparatus of the class described, including a cutter shaft, a drive shaft, a differential gearing therebetween for driving said cutter shaft, means for varying the angular velocity imparted by said gearing to reduce the speed of said cutter shaft to a minimum between successive cutting operations, and means for stopping said drive shaft when said cutter shaft is at substantially minimum speed.

13. An apparatus of the class described, including a cutter shaft, a drive shaft, a clutch for driving the latter, a brake for said drive shaft, a gearing for driving said cutter shaft at speeds accelerating from and decelerating to zero for any given speed of the drive shaft, and means for actuating the clutch and brake when the speed of the cutter shaft is at its minimum.

14. In combination, a cut-off mechanism, a cutter actuating shaft, a drive shaft parallel thereto, a train of gears for transmitting power from said drive shaft to said cutter actuating shaft, including a gear driven by said drive shaft, a gear for driving said cutter actuating shaft and an intermediate gear for transmitting power from the first mentioned gear to the second mentioned gear, a member carrying said intermediate gear, a link connected to said member, and a member on said drive shaft and having an eccentric surface operatively connected to said link for bodily moving said gear carrying member back and forth during rotation of said drive shaft.

15. An apparatus for subdividing continuously advancing material into sections, including a power input shaft, a drive shaft, a cutter actuating shaft and an oscillatory cutter, a crank on said cutter actuating shaft for operating said cutter to move it back and forth in the general direction of the path of movement of the material to be cut, a clutch between said input shaft and said drive shaft, a differential gearing between said drive shaft and said cutter shaft, means for continuously varying the transmission ratio of said gearing, and means for engaging and disengaging said clutch when said gearing is in low speed transmission phase.

SAMUEL M. LANGSTON.
KARL SIEG.